United States Patent
Silverstein (10) Patent No.: US 7,187,412 B1
(45) Date of Patent: Mar. 6, 2007

(54) POINTING DEVICE FOR DIGITAL CAMERA DISPLAY

(75) Inventor: D. Amnon Silverstein, Redwood City, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/484,667

(22) Filed: Jan. 18, 2000

(51) Int. Cl.
*H04N 5/222* (2006.01)
*H04N 5/228* (2006.01)

(52) U.S. Cl. .............................. 348/333.01; 348/208.12

(58) Field of Classification Search ............. 348/208.2, 348/208.12, 208.16, 333.01, 333.02, 333.05, 348/333.06, 333.11, 333.12, 308.16; 345/649, 345/654, 659, 156
See application file for complete search history.

(56) References Cited

U.S. PATENT DOCUMENTS

| | | | | |
|---|---|---|---|---|
| 5,138,460 A * | 8/1992 | Egawa | ....................... | 348/239 |
| 5,196,629 A | 3/1993 | Miyasaka | .................... | 358/125 |
| 5,251,037 A | 10/1993 | Busenberg | ............. | 358/213.28 |
| 5,270,756 A | 12/1993 | Busenberg | .................... | 358/109 |
| 5,602,566 A * | 2/1997 | Motosyuku et al. | ........ | 345/684 |
| 5,682,197 A | 10/1997 | Moghadam et al. | .......... | 348/36 |
| 5,689,302 A | 11/1997 | Jones et al. | ................. | 348/218 |
| 5,786,804 A | 7/1998 | Gordon | ....................... | 345/158 |
| 5,808,678 A | 9/1998 | Sakaegi | ....................... | 348/334 |
| 5,825,350 A | 10/1998 | Case, Jr. | ...................... | 345/163 |
| 5,861,916 A * | 1/1999 | Sekine et al. | ............ | 348/208.6 |
| 5,905,525 A * | 5/1999 | Ishibashi et al. | .............. | 348/39 |
| 6,069,648 A * | 5/2000 | Suso et al. | ............... | 348/14.02 |
| 6,262,769 B1 * | 7/2001 | Anderson et al. | ........ | 348/333.1 |
| 6,411,275 B1 * | 6/2002 | Hedberg | ...................... | 345/684 |
| 6,567,068 B2 * | 5/2003 | Rekimoto | .................... | 345/156 |
| 6,597,817 B1 * | 7/2003 | Silverbrook | ................. | 382/289 |
| 2002/0109782 A1 * | 8/2002 | Ejima et al. | ............ | 348/333.01 |

FOREIGN PATENT DOCUMENTS

| | | | | |
|---|---|---|---|---|
| EP | 0 734 155 A1 | 12/1995 | ..................... | 5/232 |
| EP | 0 884 890 A1 | 4/1998 | | |
| EP | 0 884 897 A1 | 6/1998 | ..................... | 5/232 |
| JP | 07131684 | 5/1995 | ..................... | 5/225 |
| WO | WO 98/14863 | 4/1998 | ...................... | 3/14 |
| WO | WO 99/12341 | 3/1999 | | |
| WO | WO 99/18495 | 4/1999 | ..................... | 3/147 |
| WO | WO 99/32960 | 7/1999 | ..................... | 3/147 |

* cited by examiner

*Primary Examiner*—Vivek Srivastava
*Assistant Examiner*—James M. Hannett (57) ABSTRACT

A process and apparatus is described to improve a digital camera user interface and increase ease of use and functionality of a digital camera by quickly, accurately and robustly permitting cursor control and designation in a digital camera display. A digital camera is used as a pointing device such as a mouse or trackball. The motion of the camera is detected, and the motion of the camera is used to position graphic elements on the camera's own display. The camera's motion can be detected with sensors, such as gyroscopes, or the camera itself can be used as a motion sensor. One application of this involves using the camera as a computer mouse, or like a gun-sight, to select images from a sheet of low-resolution ("thumbnail") images. The motion of the camera is tracked, and the user aims at the desired image from a sheet of thumbnail images. The thumbnails appear to be fixed relative to the world because the camera can continuously reposition them in the display based upon the motion of the camera. The user can then select a thumbnail in an intuitive manner by simply pointing the camera at the desired thumbnail. For alternative embodiments, the interface can be used to select regions of greater extent than can be viewed in the viewer or to virtually review images.

31 Claims, 8 Drawing Sheets

POINTING DEVICE FOR DIGITAL CAMERA DISPLAY

BACKGROUND OF THE INVENTION

1. Field of the Invention

The present invention relates to digital cameras and, more particularly, to a pointing device-based graphical user interface that uses the camera display.

2. Description of the Related Art

Digital cameras have not generally used pointing devices to interact with the interface presented on the display. Typically, they use a set of push buttons to step through menus and to select images from memory for display and deletion. New digital cameras may rely on micro display devices, instead of the now more common panel display. To view a micro display, the user needs to hold the display close to his or her eye and view the display through an eyepiece. This arrangement makes the interface controls more difficult to use, because the user will not be able to see the controls while viewing the display.

U.S. Pat. No. 5,808,678, Yuji Sakaegi, entitled "Method and Apparatus for Designing a Position on a View Finder Based on Motion Detection", which issued Sep. 15, 1998, describes the use of a switch, trackball, joystick or camera-motion controlled cursor to interact with the interface presented on a digital camera display. In the case of the switch, trackball or joystick, it is awkward to designate locations or icons when looking through the camera veiwfinder because the user must hold the camera while manipulating the controls. In the latter case, the motion of the camera is used to move the cursor about the viewfinder interface and select icons therein. This interface is also awkward to use, however, because the motion causes the cursor to wander around the viewing area in an unintuitive way.

Thus, it can be seen that modern user interface techniques impose ease of use and functionality limits upon digital cameras, and hinder the use of these cameras in many applications.

Therefore, there is an unresolved need for an improved user interface technique that can increase digital camera ease of use and functionality by quickly, accurately and robustly permitting cursor control and designation in a digital camera display.

SUMMARY OF THE INVENTION

A process and apparatus is described to improve a digital camera user interface and increase ease of use and functionality of a digital camera by quickly, accurately and robustly permitting cursor control and designation in a digital camera display.

A digital camera is used as a pointing device such as a mouse or trackball. The motion of the camera is detected, and the motion of the camera is used to position graphic elements on the camera's own display. The camera's motion can be detected with sensors, such as gyroscopes, or the camera itself can be used as a motion sensor. One application of this involves using the camera as a computer mouse, or like a gun-sight, to select images from a sheet of low-resolution ("thumbnail") images. The motion of the camera is tracked, and the user aims at the desired image from a sheet of thumbnail images. The thumbnails appear to be fixed relative to the world because the camera can continuously reposition them in the display based upon the motion of the camera. The user can then select a thumbnail in an intuitive manner by simply pointing the camera at the desired thumbnail.

For alternative embodiments, the interface can be used to select regions of greater extent than can be viewed in the viewer or to virtually review images.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–10b. Those skilled in the art will readily appreciate that the detailed description given herein with respect to these figures is for explanatory purposes, however, because the invention extends beyond these limited embodiments.

The invention described here allows a digital camera to be used as a pointing device such as a mouse or trackball. The motion of the camera is detected, and the motion of the camera is used to position graphic elements on the camera's own display. The camera's motion can be detected with sensors, such as gyroscopes, or the camera itself can be used as a motion sensor. One application of this involves using the camera as a computer mouse, or like a gun-sight, to select images from a sheet of low-resolution ("thumbnail") images. The motion of the camera is tracked, and the user aims at the desired image from a sheet of thumbnail images. This application is illustrated in greater detail below in connection with FIGS. 3a, 3b and 4.

Figure 1:
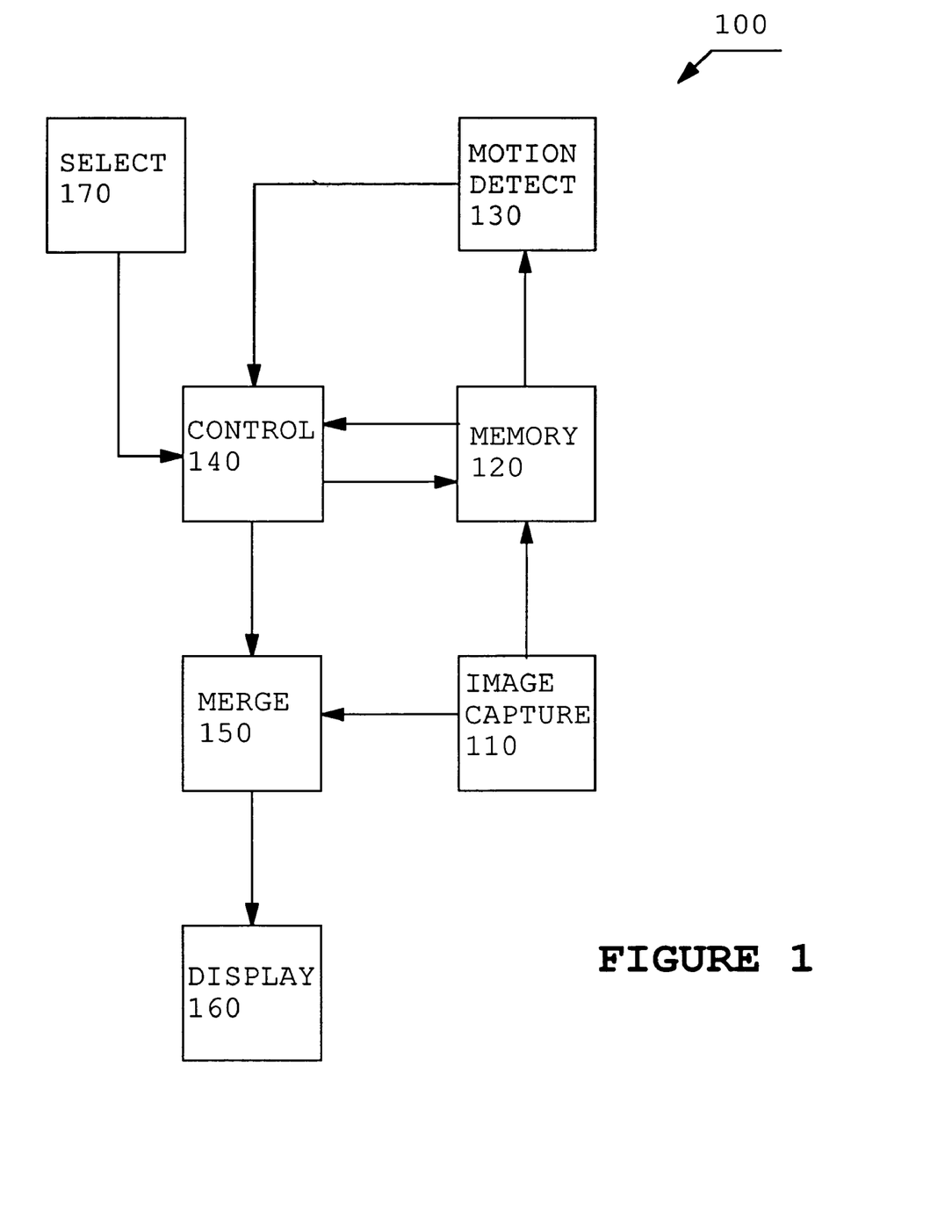
FIG. 1 is a block diagram illustrating a pointing device-based graphical user interface system for a digital camera display according to the present invention.

FIG. 1 is a block diagram illustrating a pointing device-based graphical user interface system for a digital camera display according to the present invention. In digital camera 100, an image is captured by image capture unit 110. The image capture unit 110 can be selected from among the many such devices known in the art. Preferably, image capture unit 110 will be either a CCD or CMOS imaging device, as is commonly used for image sensing in modern digital cameras.

One or more of a series of images captured by image capture unit 110 will be stored at least temporarily in memory 120. For one embodiment of the present invention, motion detection unit 130 uses the changes between subsequent images to calculate an amount and direction of motion for camera 100. There are many techniques known in the art for calculation of motion based upon changes in captured images. One such method is described in U.S. Pat. No. 5,808,678, Yuji Sakaegi, entitled "Method and Apparatus for Designing a Position on a View Finder Based on Motion Detection", which issued Sep. 15, 1998. Another such method is described in U.S. Pat. No. 5,786,804, Gary B. Gordon, entitled "Method and System for Tracking Attitude", which issued Jul. 28, 1998.

Note that, although the system of FIG. 1 teaches the use of one image capture unit 110, for an alternative embodiment, a first image capture unit can be used for capture of the digital picture taken by the camera and separate image capture unit can be used for the motion detection.

Also note that, for another embodiment of the present invention, motion detection is not performed optically by comparing subsequent images. Instead, for these embodiments, non-optical motion sensing techniques that are also well known in the art are used. One such method would be to use gyroscopes as described, for example, in U.S. Pat. No. 5,825,350, Case, Jr. et al., "Electronic Pointing Apparatus and Method", which issued Oct. 20, 1998.

As will be described below in greater detail, control unit 140 causes merge unit 150 to combine the motion detection information with the captured image and then this merged information is displayed on display 160. For example, a cursor and a set of icons, such as thumbnail images, could be merged with the series of images being captured by capture unit 110. Motion of the camera 100 would be detected and cause the thumbnail images to move within the display. When the desired icon moves under the cursor, the user could select this target icon by using selection unit 170. It is preferred that selection unit 170 be a switch on the camera 100. However, other forms of selection, such as voice command detection, are known in the art and could be employed alternatively.

Examples of suitable displays 160 include viewfinder micro displays such as are manufactured by the MicroDisplay Corporation, San Pablo, Calif., USA, or by Displaytech, of Longmont, Colo., USA. Although it is preferred that display 160 be a view finder micro display, there are many forms of suitable displays such as panel displays that are well known in the art.

Figure 2:
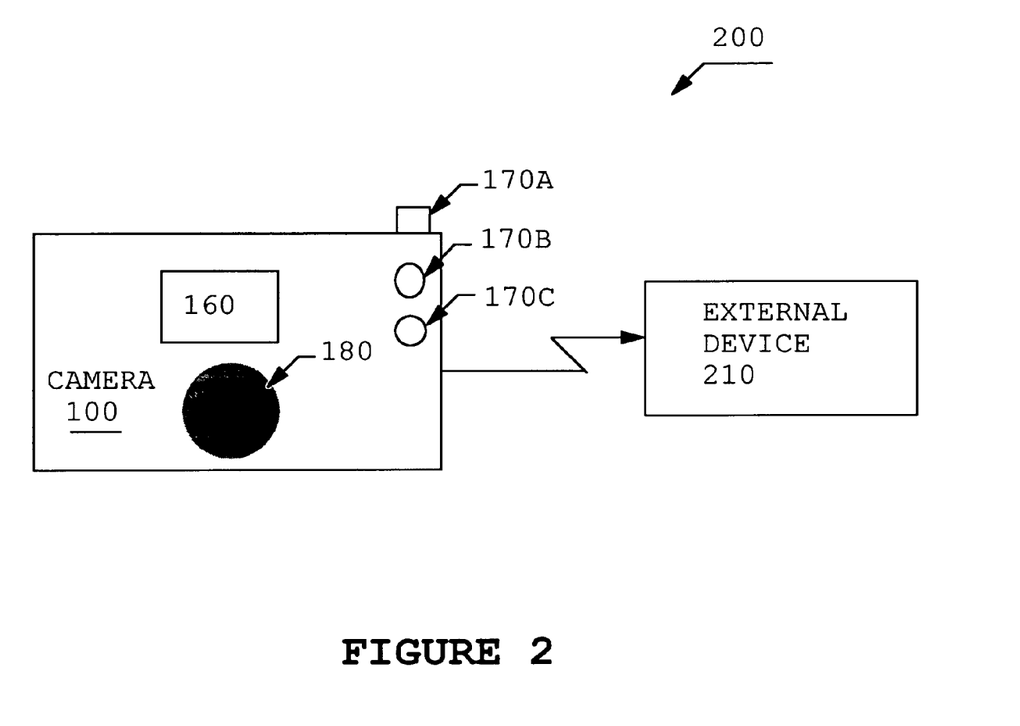
FIG. 2 is a diagram illustrating a digital imaging system having a pointing device-based graphical user interface camera according to the present invention.

FIG. 2 is a diagram illustrating a digital imaging system having a pointing device-based graphical user interface camera according to the present invention. In FIG. 2, camera 100 is shown coupled to external device 210. The coupling can be accomplished using wire cable or fiber optic links. The coupling can also be accomplished using a wireless link such as infrared or radio links. External device 210 can include any of the many known external devices that are commonly associated with digital cameras such as a computer, external memory, modem, or printer. It is to be understood, however, that digital camera 100 need not be linked to external device 210 for the present invention to be practiced.

In FIG. 2 it can be seen that for this embodiment, camera 100 has a display 160 and three selection buttons 170A, 170B and 170C. Note that image capture unit 180 is shown in FIG. 2 as being shaded because the image capture unit is generally located on the side of the camera opposite to the side having the display 160.

For this embodiment, three selection buttons, 170A, 170B and 170C, are shown. For this example, selection button 170A is used to operate an optical or electronic zoom. Buttons 170B and 170C are used together in an application-specific manner. For example, button 170C can be used to enter a particular mode, such as thumbnail image selection. In the thumbnail image selection mode, button 170B can then be used to select a particular thumbnail image when the camera motion causes the target thumbnail icon to be moved under the cursor.

Note that this arrangement of buttons makes it easy to use camera 100 as a gun-sight-like pointing device within a graphical user interface. Digital cameras have not generally used pointing devices to interact with the interface presented on the display. Typically, they use a set of push buttons to step through menus and to select images from memory for display and deletion. To view a micro display, the user needs to hold the display close to his or her eye and view the display through an eyepiece. This arrangement makes the interface controls more difficult to use, because the user will not be able to see the controls while viewing the display.

The present invention allows the user to interact with the information display in a way similar to the computer mouse. For one embodiment of the present invention, the entire body of the camera is moved, and the movement of the camera is recorded. The motion information can then be used to position a cursor, or to position graphic elements. For example, graphic elements can be positioned so they stay fixed relative to the world as the user moves the camera.

With most digital still cameras, the user can load a previously captured image to the display by selecting it from a grid of low-resolution ("thumbnail") images. The thumbnail is selected by pressing buttons that move a cursor across the thumbnails until the desired picture is under the cursor. With the new method, the user can look into a micro display and will be presented with the thumbnails. A computer within the camera can continuously reposition the thumbnails so they appear to be fixed relative to the world. The user can then select a thumbnail by simply pointing the camera at the desired thumbnail.

For one embodiment of the present implementation, the position of the camera is tracked by optical flow. The camera records a sequence of images. By comparing the images with each other, the motion of the camera can be estimated. Determining the motion of the camera by comparing sequential images taken with the camera is well described in the literature, and this approach has the advantage of not requiring any additional hardware. Alternative implementations use sensors such as gyroscopes, tilt sensors, compasses, or a GPS receiver to measure the position of the camera. These solutions may be more robust, but may also be more expensive to implement.

Using the Camera Like a Mouse

Figure 3A:
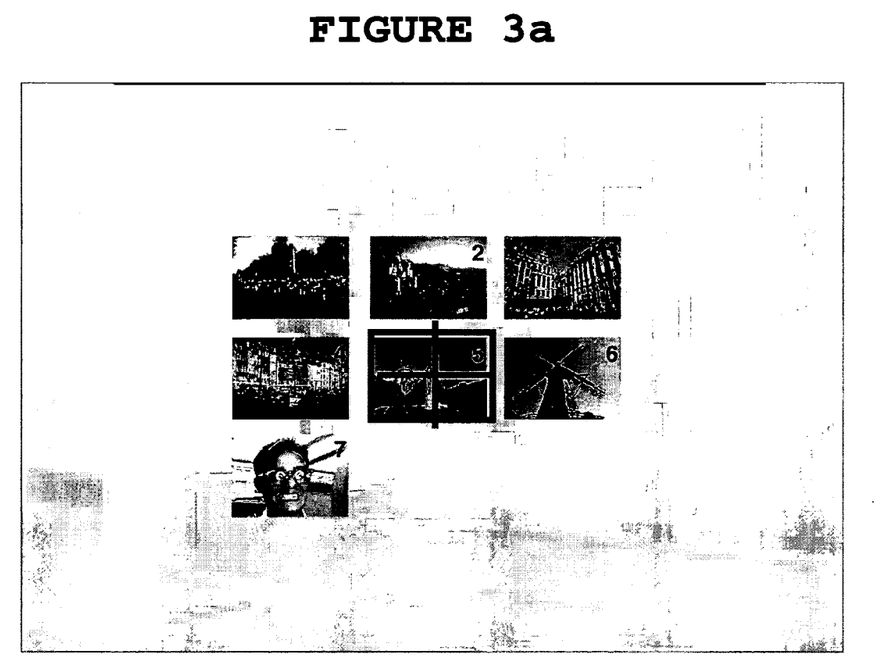
FIGS. 3a and 3b illustrate use of the camera as a pointing device to select thumbnail images according to an embodiment of the present invention.
Figure 3B:
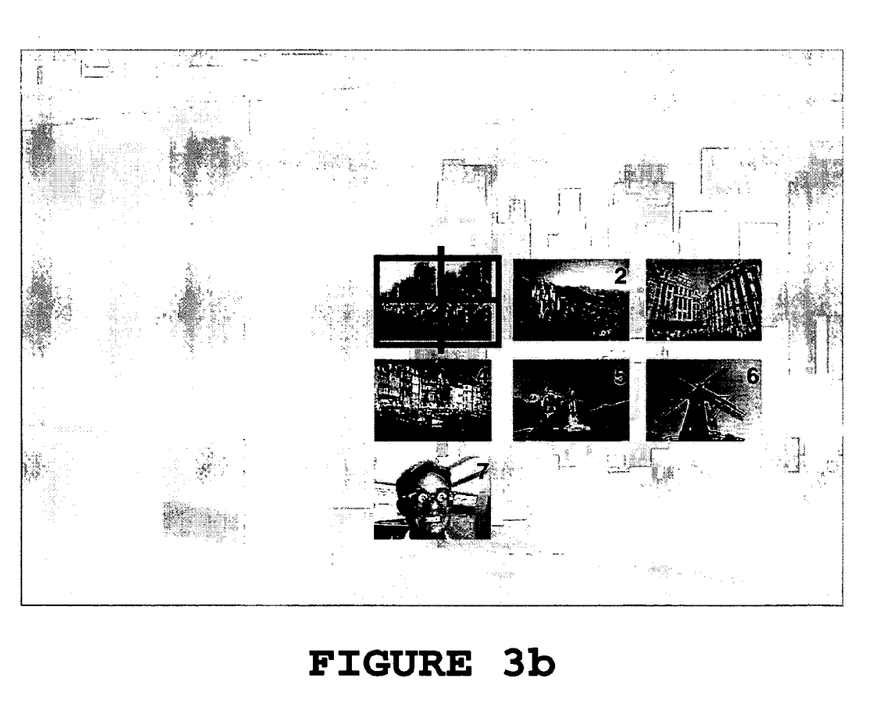

FIGS. 3a and 3b illustrate use of the camera as a pointing device to select thumbnail images according to an embodiment of the present invention. In FIG. 3a, a sheet of thumbnail images is shown superimposed on a view through the camera. The cross hair is a cursor, and for one embodiment, the cursor is always fixed relative to the camera, e.g., the cross hair cursor is fixed in the center of the view. The sheet of thumbnail images is fixed relative to the world by using motion tracking. That is, the computer constantly repositions the sheet as the camera moves, so the sheet seems to be fixed in position relative to the objects seen through the camera. As shown in FIG. 3b, when the user moves the camera, the cursor moves relative to the world and to the world-fixed thumbnails. This allows the user to select an image by simply pointing the camera at the desired image. The camera itself is used as the only pointing device. No other mouse, joystick or other device need be used to move the cursor.

How it Works

Figure 4:
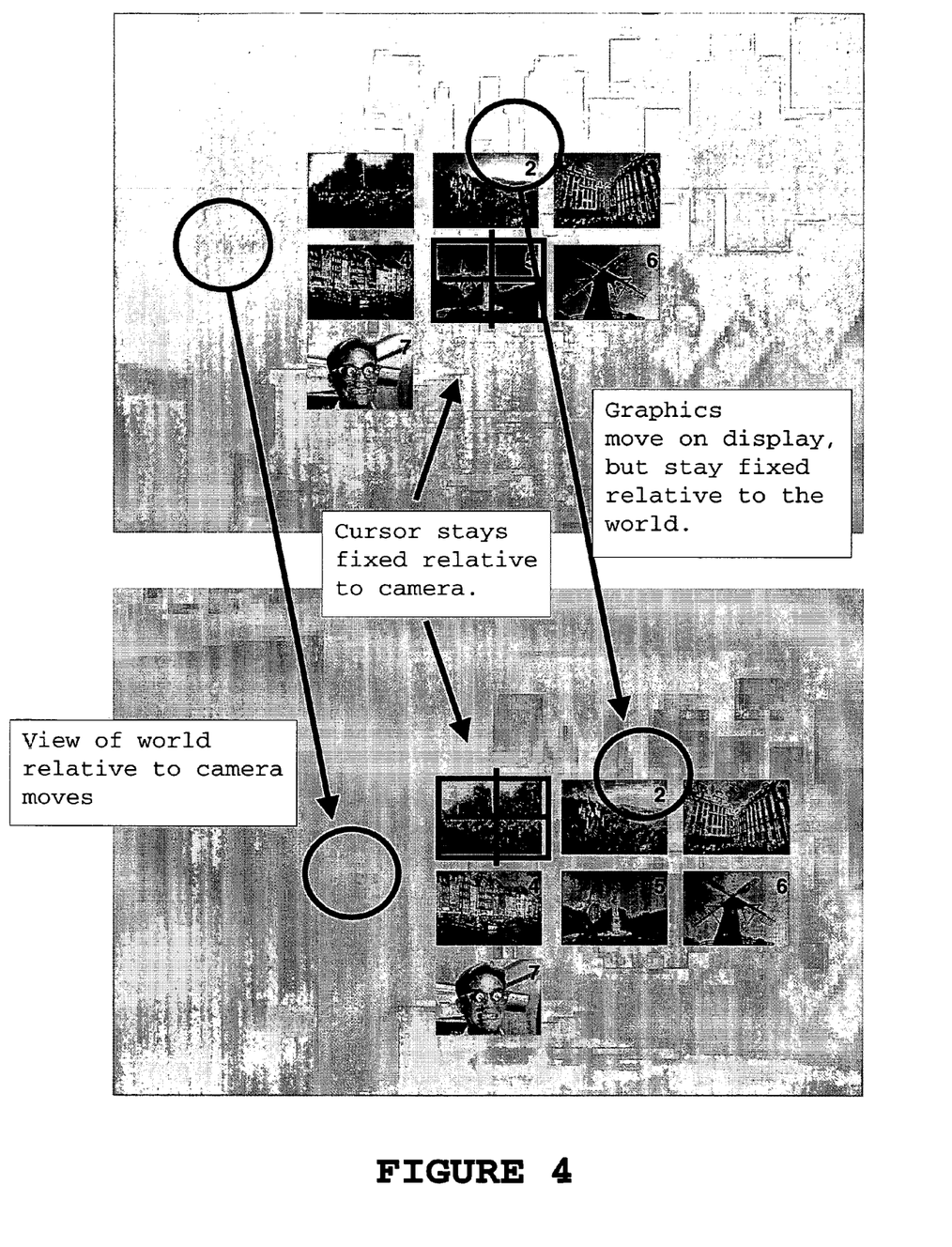
FIG. 4 is a diagram illustrating how the thumbnail images of FIGS. 3a and 3b are made to appear to be motionless relative to objects of the scene.

FIG. 4 is a diagram illustrating how the thumbnail images of FIGS. 3a and 3b are made to appear to be motionless relative to objects of the scene. Motion tracking software tracks the motion of image features in the scene. For example, the image of the computer monitor on the desk moved down and slightly right between frame 1 and frame 2. The sheet of thumbnails is moved by the same amount, and in the same direction, as the features in the scene. The sheet thus appears to be motionless relative to the objects in the scene (such as the computer monitor).

Because the thumbnails appear fixed relative to the world, the user can use the camera like a gun-sight. The cross hairs stay fixed relative to the camera, and the sheet of thumbnails stays fixed relative to the world, so the user can place the cross hairs on the desired thumbnail by simply aiming the camera. This feature provides a very simple to use and intuitive user interface.

The viewfinder display may be a micro display that is viewed directly through some optics. Such a display has inherit advantages over a panel display, because it is typically brighter, higher resolution, has more colors, subtends a larger viewing angle, and requires less power. In one viewing mode, the operator of the camera can see the display at the same time as the scene. The display can be partially transparent, be optically mixed with the world by means of a beamsplitter, or digitally mixed with an image captured with the camera.

In a second alternative mode, the direct view of the scene is closed off, perhaps by means of a shutter. In this mode only the images on the display can be seen. There could also be other alternative modes where part of the scene is masked off, and in these regions only the display can be seen. For example, the operator could view a mixture of an optical view of the scene with graphics in the top half of the display, and only graphical status information against a black background in the bottom half of the display. The masking can even be done with an electronic element, where the display information can be made to appear as an opaque overlay to the optical view of the scene.

The motion tracking keeps track of the camera's angular position in the world. As previously described, this can be done by tracking motion using the camera's light sensors, or it could be done with other instruments such as a compass, a gyroscope, a GPS sensor, or the like.

Virtual Selection

For one embodiment, the camera is used to select positions or regions of the scene. The operator simply points the camera at objects or locations in the scene, and then uses a button or the like to indicate the selection. These regions can then be used to assist in the capture or processing of the image.

Figure 5A:
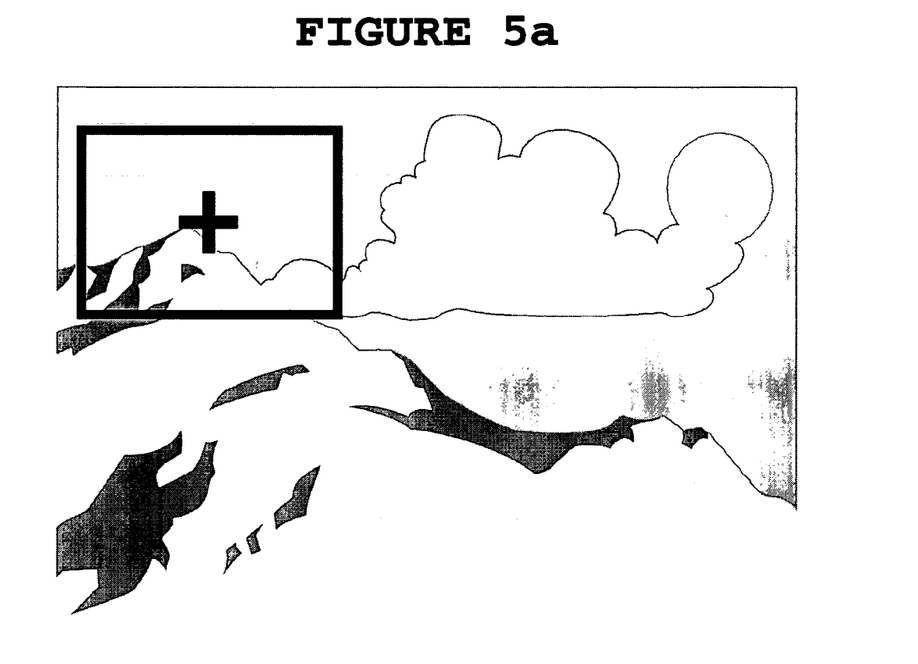
FIGS. 5a and 5b illustrate use of the camera as a pointing device to select a portion of the scene larger than the viewfinder according to an embodiment of the present invention.
Figure 5B:
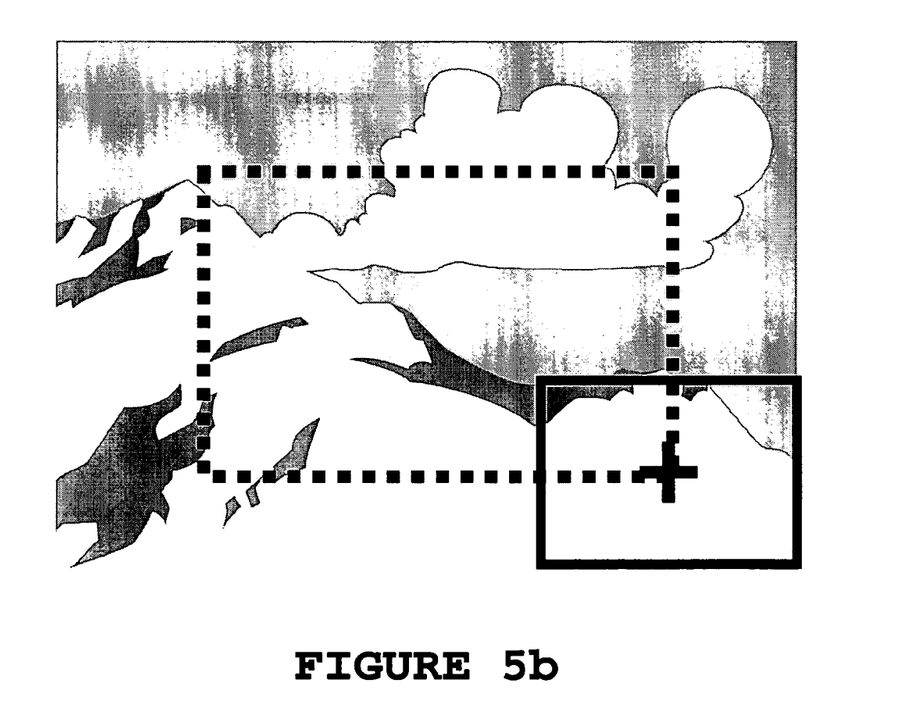

FIGS. 5a and 5b illustrate use of the camera as a pointing device to select a portion of the scene according to an embodiment of the present invention. For example, a rectangular region that is larger than the viewfinder of the camera can be selected by marking two opposite corners of the region. In this example, the selected rectangle is the dotted rectangle of FIG. 5b. The viewfinder is illustrated by the solid rectangle, and the cross-shaped cursor is used to select the first corner of the region in FIG. 5a, and the second, diagonal corner of the region in FIG. 5b. Note that alternative shaped areas can be designated. For example, two points could be specified to define a center and radius to designate a circular region, or N points could be chosen to specify an N-sided polygonal region.

Regardless of its shape, the region can be used for several purposes. It can delimit the boundaries of a region to be captured using multiple tiled images. It can be a region that is supposed to receive special processing, such as reduced image compression to preserve important details. It can also be used to change the zoom, so the camera can capture the framed region without any waste due to cropping.

Selected locations can be fixed in space by tracking the camera's movement. Alternatively, moving selected targets can be tracked by means such as motion tracking. For example, a soccer player's face could be selected. Motion tracking would then track the face, and the focus could automatically be adjusted to keep this face in focus.

Important scene locations that would aid in image capture can also be marked. For example, the light source can be marked, and this information can greatly aid color correction or other image processing. Note that the light source need not be located within the image to be photographed. For one embodiment, the photographer can collect information for image processing by pointing the camera at the light source (or sources), either before or after capturing the image. For an alternative embodiment, the subject can be marked for auto-focus. Areas of the view can also be marked as triggers, where image motion in a trigger area will make the camera take a picture. For example, a tripod-mounted camera could be set to take a picture if motion is detected crossing the finish line of a racetrack.

Heads-Up Information

Figure 6:
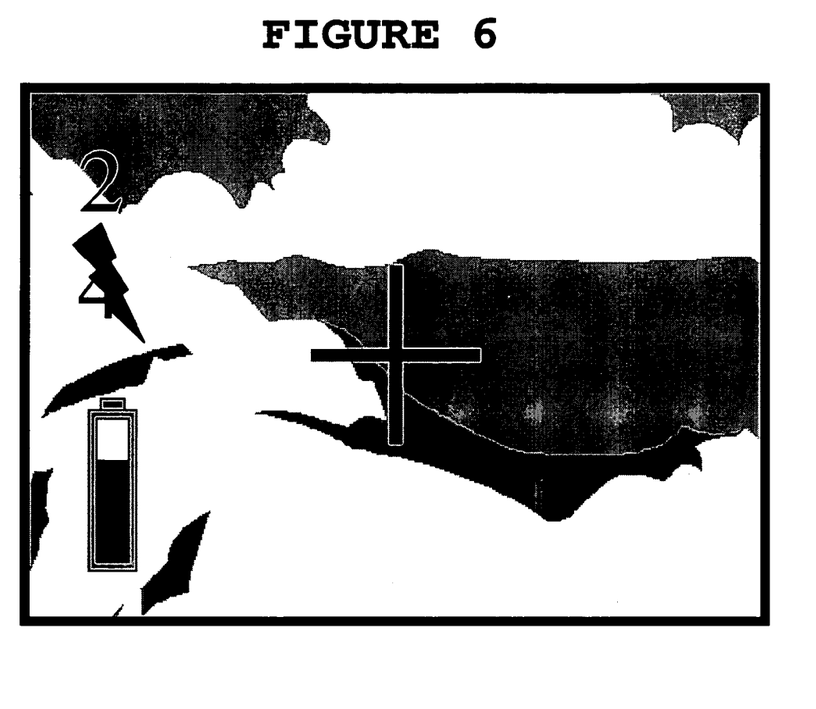
FIG. 6 is a diagram illustrating heads-up display of status information according to an embodiment of the present invention.
Figure 7:
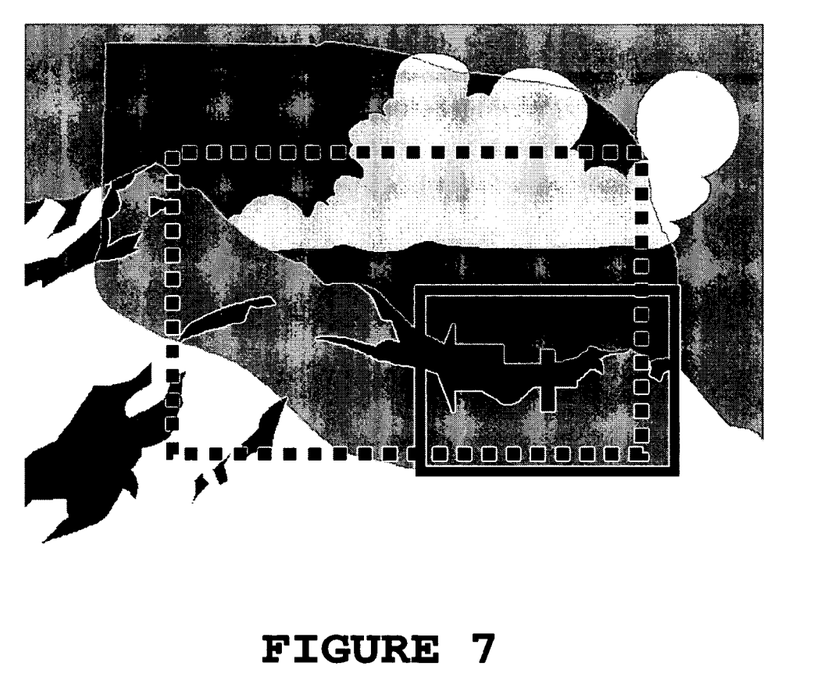
FIG. 7 is a diagram illustrating use of heads-up data during a guided swipe of a panoramic scene according to an embodiment of the present invention.

As shown in FIG. 6, a viewfinder display that has look-through capability can display information that is usually presented on a small status-display. It can show the state of the flash, the amount of storage remaining, the degree of compression, and the like. If the user requires more information, the cursor can easily be moved over the status display to select a more detailed display of information. The information is easier to access from the viewfinder display, because it can be seen while the picture is being framed. When using the virtual selection described above, the heads-up display can show the user the region or locations that have been selected. FIG. 7 is a diagram illustrating use of heads-up data during guided swipe of a panoramic scene according to an embodiment of the present invention. In this example of capturing a large region with multiple tiled images, the camera can show the operator the selected region (the dashed rectangle), the area of the selected region that had already been captured (slightly darkened), and instructions on which way to point the camera to capture the unrecorded parts of the region (the left arrow).

Virtual Review

Figure 8:
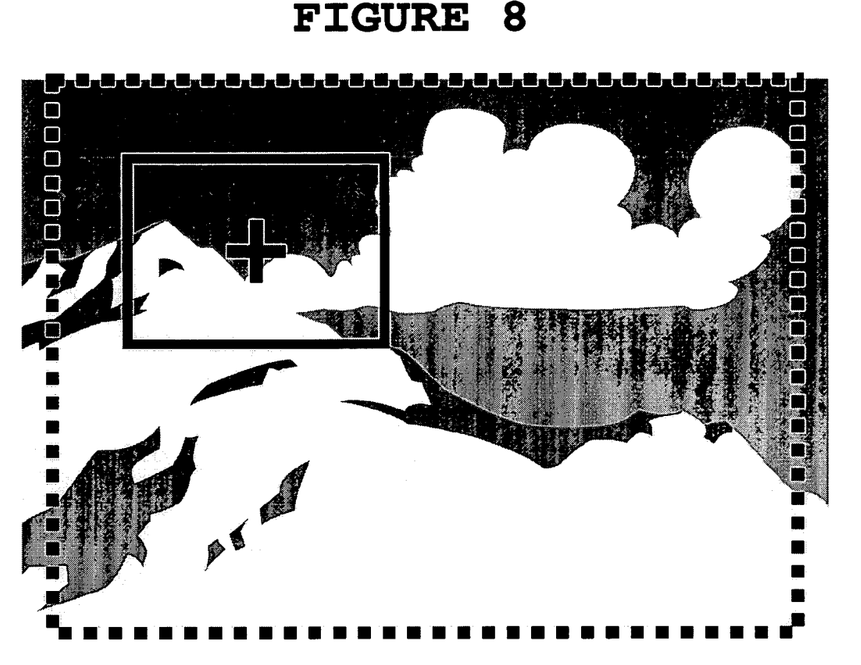
FIG. 8 is a diagram illustrating tracking during virtual review of the panoramic scene according to an embodiment of the present invention.

With motion tracking and a viewfinder display, the operator can be presented with a virtual panorama. FIG. 8 is a diagram illustrating tracking during virtual review of the panoramic scene according to an embodiment of the present invention. After capture and tiling to form an oversized image, such as a panorama, the user can view the panorama by looking into the viewfinder. Moving the camera will cause the panorama (the dashed rectangle) to move in the opposite direction in the camera, thus giving the impression that a large scene is being viewed through the window of the viewfinder (the solid rectangle). The operator will feel immersed in the panoramic scene. Alternatively, images that have more pixels than the micro display can show can be displayed. The operator simply moves the camera to view different parts of the image.

Image Manipulation

Figure 9:
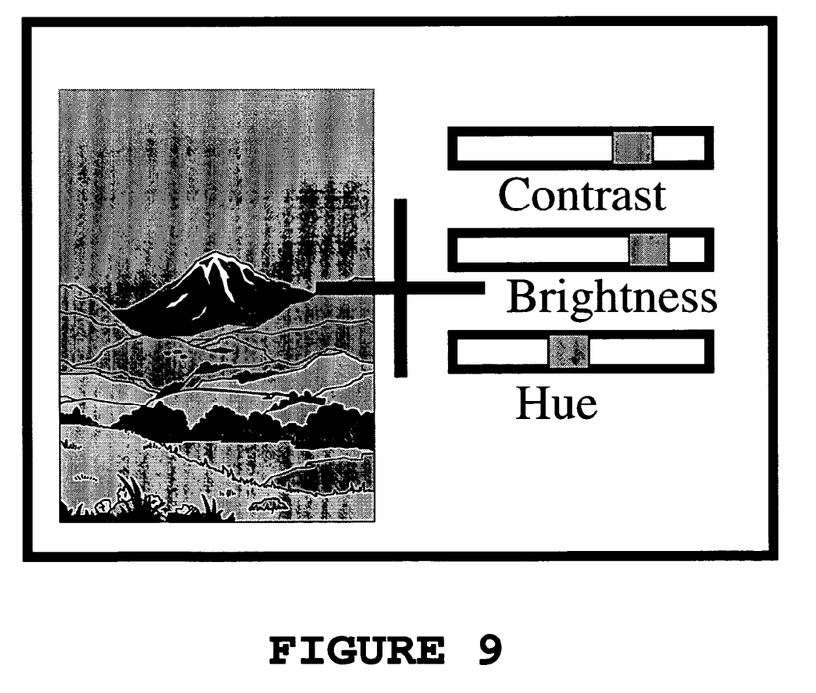
FIG. 9 is a diagram illustrating image manipulation according to an embodiment of the present invention.

The combination of a high-resolution colorful viewfinder display with a camera permits the camera to be used for image manipulations such as cropping, color correction and page layout. FIG. 9 is a diagram illustrating image manipulation according to an embodiment of the present invention. In this example, the cursor can be used to adjust the contrast, brightness or hue of the selected image by dragging the slider for the appropriate icon.

Figure 10A:
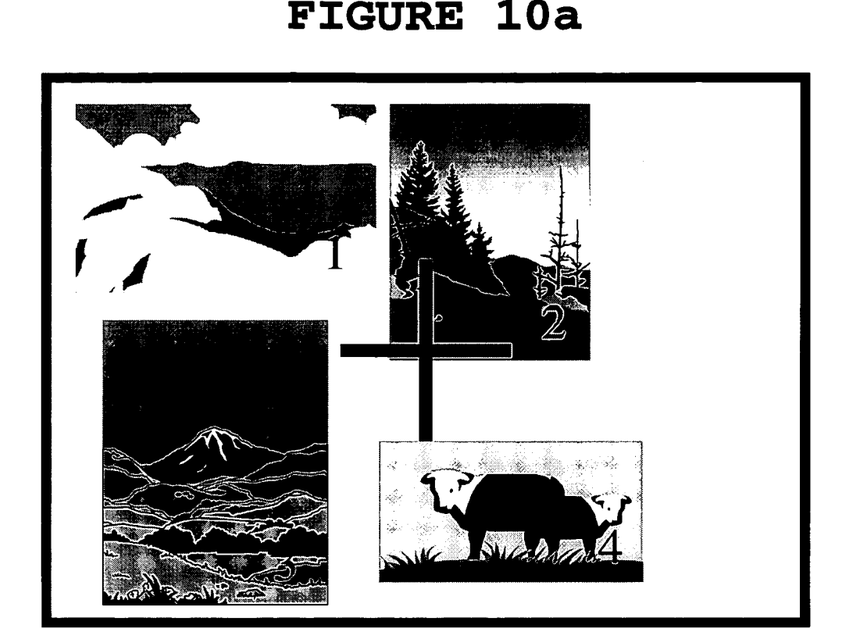
FIGS. 10a and 10b illustrate use of the camera as a pointing device to select thumbnail images for high resolution page layout according to an embodiment of the present invention.
Figure 10B:
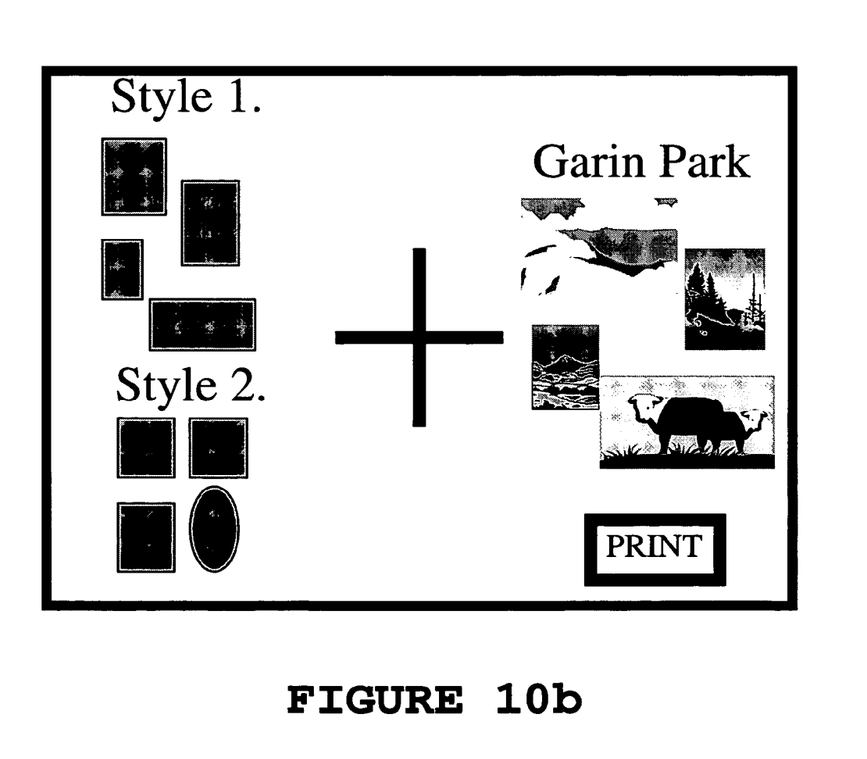

FIGS. 10a and 10b illustrate use of the camera as a pointing device to select thumbnail images for high resolution page layout according to an embodiment of the present invention. The cursor is used to select thumbnail images in FIG. 10a. The cursor is then used in FIG. 10b to select a page layout style and to cause the resulting image to be sent to a printer for printing.

One advantage to performing these operations on the camera instead of after downloading the images to the computer is that the processing can be done before image compression. Some operations can also reduce the size of the image, which will thereby reduce the storage requirements for the image. For example, regions that were discarded when an image was cropped would not need to be stored on the camera. Further, this can eliminate the need for an external computer altogether. The images can be sent directly to the printer or other external device.

Super-Resolution and Stereoscopic Imaging

If the position of the camera is very precisely known, a higher resolution image can be synthesized from several images taken with slightly different locations.

Also, by tracking the camera's position and possibly even guiding the operator to the correct position, a second image could be captured at a location that provides a good stereoscopic pair to the first image. The camera could also be used as a stereoscopic display device if it had two viewfinder displays. Alternatively, if the camera had two capture devices, stereoscopic images could be captured more easily, and stereoscopic panoramas could be captured. These panoramas could be reviewed with stereoscopic viewfinders in the virtual mode previously described.

Games

By having computer graphics combined with an optical view of the scene, new types of games would be possible. Game elements could be superimposed on the view of the scene, and motion tracking of the camera could be used to position the elements so they stay fixed relative to the scene. For example, a computer graphic image of a ball could be launched from the camera. It could then be made to appear as if the ball had hit an object in the scene. The place where the ball had hit could be marked with further graphics.

Tracking Position

If the full position of the camera in multiple dimensions is collected, by means of GPS for example, this information can be used to automatically record where and when the picture was taken. Any information on the angular position of the camera, the time of day, and the geographic location of the camera can also be used for color correcting the image. For example, if the picture were taken at night, the camera would not use color correction for daylight. Or, if it is known that the camera was facing north at 3 pm at a certain location, the position of the sun could be determined, and some useful characteristics of the sunlight could be estimated which would allow improved image processing.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for a camera having a display, the process comprising the steps of:
   presenting a cursor and a plurality of icons at respective positions in the display;
   sensing motion of the camera;
   maintaining the position of the cursor fixed in the display while repositioning the icons in the display in a direction opposite to the sensed motion of the camera; and
   in response to user input selecting a target one of the icons positioned under the cursor.

2. The process as set forth in claim 1, wherein the presenting step comprises superimposing the cursor and the icons on a scene viewed through the camera.

3. The process as set forth in claim 1, wherein the motion is sensed using a non-optical motion detector.

4. The process as set forth in claim 1, wherein the motion is sensed using an optical motion detector.

5. The process as set forth in claim 1, wherein the target icon is associated with a function to be performed when the target icon is selected.

6. The process as set forth in claim 1, further comprising tracking features in a scene viewed through the camera, and wherein at least one of the icons is repositioned to appear to be fixed in space with regard to the tracked features.

7. The process as set forth in claim 6, wherein the at least one of the icons is repositioned by an amount corresponding, to the sensed motion of the camera.

8. The process as set forth in claim 1, wherein each of the icons is a thumbnail image.

9. The process as set forth in claim 8, including the steps of:
   interpreting the sensed motion of the camera as user input; and
   performing image manipulation on a high resolution image associated with a selected one of the thumbnail images in a manner responsive to the interpreted user input.

10. The process as set forth in claim 9, including the step of transferring the manipulated high resolution image to a device external to the camera.

11. A process for a camera having a display, comprising:
   sensing motion of the camera;
   interpreting sensed motion of the camera as a user interface input, wherein the interpreting step comprises determining a viewpoint for displaying a region of a given image on the display based on the sensed motion of the camera, wherein the given image comprises a collection of icons; and
   presenting on the display images superimposed on a scene viewed though the camera in accordance with the interpreted user interface input.

12. The process of claim 11, wherein the collection of icons includes thumbnail images each corresponding to a lower-resolution version of a respective stored image.

13. The process of claim 11, wherein the presenting step comprises presenting in the display different regions of the given image containing respective subsets of the collection of icons in accordance with the determined viewpoint.

14. The process of claim 13, wherein the presenting step comprises superimposing a cursor in front of the displayed region of the give image, and further comprising selecting an icon displayed behind the cursor in response to a user selection input.

15. A process for a camera having a display, comprising:
   sensing motion of the camera, wherein the sensing step comprises tracking motion of the camera;
   interpreting sensed motion of the camera as a user interface input; and
   presenting on the display images superimposed on a scene viewed though the camera in accordance with the interpreted user interface input;
   wherein the interpreting step comprises determining a sequence of regions of a given image to present on the display reflecting the tracked motion of the camera, and the presenting step comprises presenting the sequence of regions.

16. A process for a camera having a display, comprising:
   sensing motion of the camera, wherein the sensing step comprises acquiring a sequence of images and comparing successive images in the sequence to determine parameters describing motion of the camera;
   interpreting the sensed motion of the camera as a user interface input; and
   presenting on the display images superimposed on a scene viewed though the camera in accordance with the interpreted user interface input.

17. A camera, comprising:
   a display;
   a motion sensor configured to sense motion of the camera; and
   circuitry configured to interpret sensed motion of the device as a user interface input and to present on the display images superimposed on a scene viewed though the camera in accordance with the interpreted user interface input, the circuitry being configured to determine a viewpoint for displaying a region of a given image on the display based on the sensed motion of the camera, wherein the given image comprises a collection of icons.

18. The camera of claim 17, wherein the collection of icons includes thumbnail images each corresponding to a lower-resolution version of a respective stored image.

19. The camera of claim 17, wherein the circuitry is configured to present in the display different regions of the given image containing respective subsets of the collection of icons in accordance with the determined viewpoint.

20. The camera of claim 19, wherein the circuitry is configured to superimpose a cursor in front of the displayed region of the give image, and further comprising selecting an icon displayed behind the cursor in response to a user selection input.

21. A camera, comprising:
   a display;
   a motion sensor configured to sense motion of the camera; and
   circuitry configured to interpret sensed motion of the camera as a user interface input and to present on the display images superimposed on a scene viewed though the camera in accordance with the interpreted user interface input, wherein the circuitry is configured to determine a sequence of regions of a given image to present on the display reflecting the tracked motion of the camera, and the presenting step comprises presenting the sequence of regions.

22. A camera, comprising:
   a display;
   a motion sensor configured to sense motion of the camera; and
   circuitry configured to interpret sensed motion of the camera as a user interface input and to present on the display images superimposed on a scene viewed though the camera in accordance with the interpreted user interface input, wherein the circuitry is configured to acquire a sequence of images and compare successive images in the sequence to determine parameters describing motion of the device.

23. A process for a camera having a display, comprising:
   sensing motion of the camera;
   interpreting sensed motion of the camera as a user interface input; and
   presenting on the display images superimposed on a scene viewed though the camera in accordance with the interpreted user interface input, wherein the presenting comprises simultaneously presenting a virtual image and an image of a scene viewed through the camera, wherein the virtual image includes a sheet of thumbnail images superimposed on a view through the camera.

24. A process for a camera having a display, comprising:
   sensing motion corresponding to motion of the display;
   interpreting the sensed motion as a user interface input; and
   presenting images on the display in accordance with the interpreted user interface input, wherein presenting comprises presenting different portions of a virtual panorama in the display in accordance with the interpreted user interface input, wherein the virtual panorama is composed of multiple images captured by the camera.

25. A process for a camera having a display, comprising:
   sensing motion corresponding to motion of the display;
   interpreting the sensed motion as a user interface input;

presenting images on the display in accordance with the interpreted user interface input, including superimposing a pointer on an external scene viewed through the display; and selecting boundaries of a portion of the external scene based on the interpreted user interface input and locations of the pointer superimposed on views of the external scene.

26. The process of claim 25, wherein the selecting comprises selecting each of the boundaries at a different respective view of the external scene.

27. The process of claim 26, further comprising storing the designated region boundaries in the camera.

28. The process of claim 26, further comprising modifying a captured image in response to the interpreted user interface input.

29. The process of claim 28, wherein the modifying comprises cropping the captured image.

30. A process for a camera having a display, comprising:
sensing motion of the camera;
interpreting sensed motion of the camera as a user interface input;
presenting images on the display in accordance with the interpreted user interface input; and
modifying a captured image in response to the interpreted user interface input, wherein modifying comprises changing color parameters associated with the captured image.

31. A process for a camera having a display, comprising:
sensing motion of the camera, wherein the sensing step comprises tracking motion of the camera;
interpreting sensed motion of the camera as a user interface input;
presenting on the display images superimposed on a scene viewed though the camera in accordance with the interpreted user interface input;
wherein the camera additionally has a second display, and further comprising presenting in the first and second displays a stereoscopic pair of images captured by the camera based on the tracked motion of the camera.

* * * * *

UNITED STATES PATENT AND TRADEMARK OFFICE
CERTIFICATE OF CORRECTION

PATENT NO. : 7,187,412 B1
APPLICATION NO. : 09/484667
DATED : March 6, 2007
INVENTOR(S) : D. Amnon Silverstein It is certified that error appears in the above-identified patent and that said Letters Patent is hereby corrected as shown below:

In column 8, line 64, in Claim 7, delete "corresponding," and insert -- corresponding --, therefor.

In column 9, line 21, in Claim 11, delete "though" and insert -- through --, therefor.

In column 9, line 32, in Claim 14, delete "give" and insert -- given --, therefor.

In column 9, line 41, in Claim 15, delete "though" and insert -- through --, therefor.

In column 9, line 56, in Claim 16, delete "though" and insert -- through --, therefor.

In column 9, line 64, in Claim 17, delete "though" and insert -- through --, therefor, In column 10, line 13, in Claim 20, delete "give" and insert -- given --, therefor.

In column 10, line 23, in Claim 21, delete "though" and insert -- through --, therefor.

In column 10, line 36, in Claim 22, delete "though" and insert -- through --, therefor.

In column 10, line 47, in Claim 23, delete "though" and insert -- through --, therefor.

In column 12, line 15, in Claim 31, delete "though" and insert -- through --, therefor.

Signed and Sealed this

Twenty-fourth Day of November, 2009

David J. Kappos
*Director of the United States Patent and Trademark Office*